(12) United States Patent
Xiong et al.

(10) Patent No.: US 12,185,322 B2
(45) Date of Patent: Dec. 31, 2024

(54) SCHEDULING REQUEST TRANSMISSION OPPORTUNITY AND RESOURCE CONFIGURATION IN NEW RADIO

(71) Applicant: Apple Inc., Cupertino, CA (US)

(72) Inventors: Gang Xiong, Portland, OR (US); Debdeep Chatterjee, San Jose, CA (US); Sergey Panteleev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 531 days.

(21) Appl. No.: 17/530,642

(22) Filed: Nov. 19, 2021

(65) Prior Publication Data

US 2022/0078833 A1  Mar. 10, 2022

Related U.S. Application Data

(63) Continuation of application No. 16/126,556, filed on Sep. 10, 2018, now abandoned.

(60) Provisional application No. 62/587,817, filed on Nov. 17, 2017, provisional application No. 62/556,993, filed on Sep. 11, 2017.

(51) Int. Cl.
| | | |
|---|---|---|
| H04W 72/21 | (2023.01) | |
| H04L 1/1607 | (2023.01) | |
| H04L 5/00 | (2006.01) | |
| H04W 56/00 | (2009.01) | |
| H04W 72/0446 | (2023.01) | |
| H04W 72/20 | (2023.01) | |
| H04L 5/14 | (2006.01) | |
| H04W 72/23 | (2023.01) | |

(52) U.S. Cl.
CPC .......... *H04W 72/21* (2023.01); *H04L 1/1614* (2013.01); *H04L 5/0048* (2013.01); *H04W 56/001* (2013.01); *H04W 72/0446* (2013.01); *H04W 72/20* (2023.01); *H04L 5/1469* (2013.01); *H04W 72/23* (2023.01)

(58) Field of Classification Search
CPC ............... H04W 72/21; H04W 56/001; H04W 72/0446; H04W 72/20; H04W 72/23; H04L 1/1614; H04L 5/0048; H04L 5/1469
See application file for complete search history.

(56) References Cited

U.S. PATENT DOCUMENTS

| | | |
|---|---|---|
| 2012/0076028 A1 | 3/2012 | Ko |
| 2012/0155436 A1 | 6/2012 | Lindoff |
| 2016/0192376 A1 | 6/2016 | Lee |
| 2017/0150447 A1 | 5/2017 | Kim |

(Continued)

OTHER PUBLICATIONS

Non-Final Office Action dated Jan. 7, 2020 in connection with U.S. Appl. No. 16/126,556.

(Continued)

*Primary Examiner* — Rina C Pancholi

(74) *Attorney, Agent, or Firm* — Eschweiler & Potashnik, LLC

(57) ABSTRACT

Methods and architectures for establishing an uplink control channel in a fifth generation (5G) or new radio (NR) wireless network includes transmitting scheduling requests (SRs) at sub-slot level/symbol-level periodicities and determining whether SR transmit opportunities will collide with downlink (DL) signals being received and halting an SR transmission if the timing of DL symbols overlap at an OFDM symbol with the SR transmission.

20 Claims, 6 Drawing Sheets

Example of SR resources with different periodicities

(56) References Cited

U.S. PATENT DOCUMENTS

| | | | |
|---|---|---|---|
| 2018/0049227 A1* | 2/2018 | Moon | H04W 72/0446 |
| 2018/0049230 A1 | 2/2018 | Moradi | |
| 2018/0199334 A1* | 7/2018 | Ying | H04W 48/12 |
| 2018/0279274 A1 | 9/2018 | Sun | |
| 2018/0279324 A1 | 9/2018 | Wang | |
| 2018/0324872 A1 | 11/2018 | Babaei | |
| 2019/0044639 A1 | 2/2019 | Ouchi | |
| 2019/0045529 A1 | 7/2019 | Xiong | |
| 2019/0230578 A1 | 7/2019 | Karaki | |
| 2019/0239239 A1 | 8/2019 | Hwang | |
| 2020/0092055 A1 | 3/2020 | Choi | |

OTHER PUBLICATIONS

Final Office Action dated Apr. 23, 2020 in connection with U.S. Appl. No. 16/126,556.
Non-Final Office Action dated Nov. 4, 2020 in connection with U.S. Appl. No. 16/126,556.
Final Office Action dated Mar. 19, 2021 in connection with U.S. Appl. No. 16/126,556.
Non-Final Office Action dated Jul. 27, 2021 in connection with U.S. Appl. No. 16/126,556.

* cited by examiner

Example of SR resources with different periodicities

Example of SR collision with SSB in TDD system

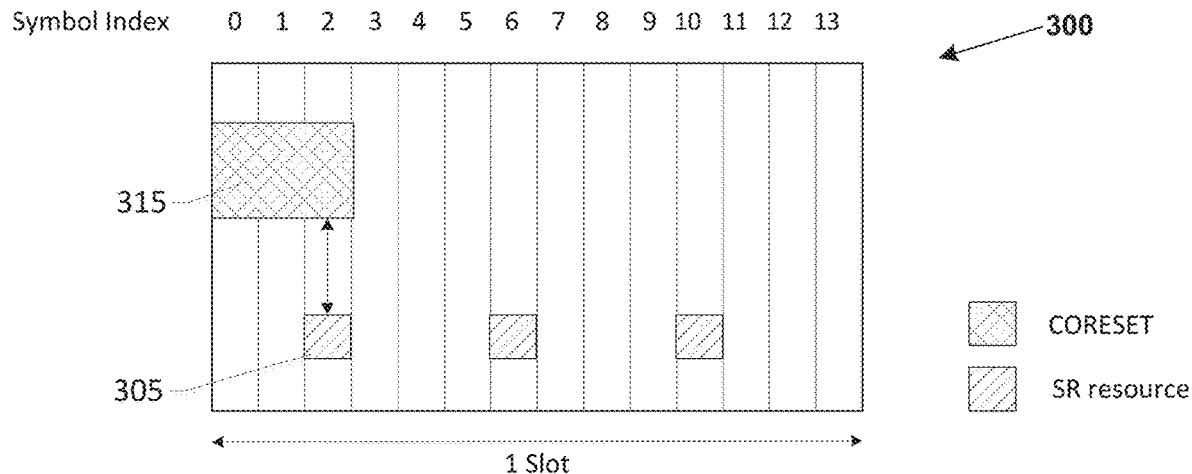
FIG. 3    Example of SR Collision with CORESET in a TDD system
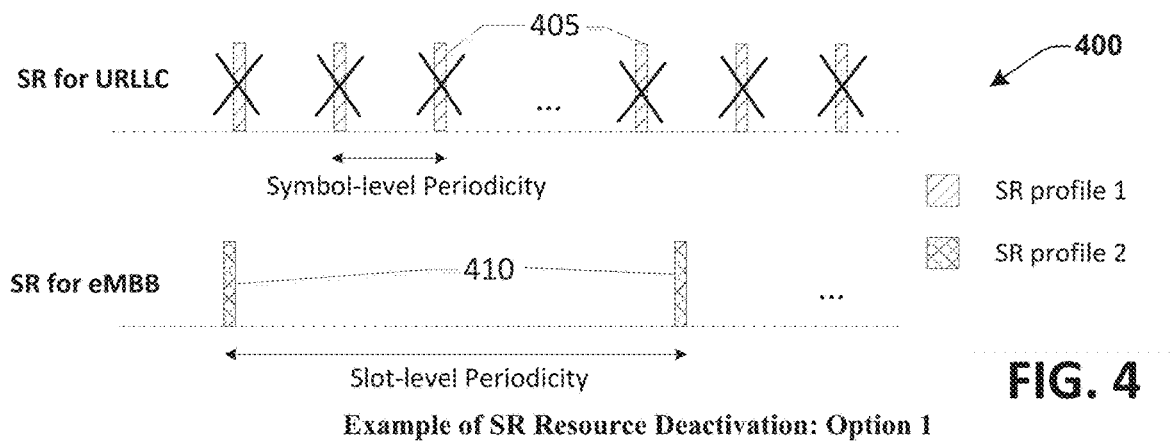
FIG. 4    Example of SR Resource Deactivation: Option 1
FIG. 5    Example of SR Resource Deactivation: Option 2

SCHEDULING REQUEST TRANSMISSION OPPORTUNITY AND RESOURCE CONFIGURATION IN NEW RADIO

CROSS-REFERENCE TO RELATED APPLICATIONS

This application is a Continuation Patent Application of U.S. patent application Ser. No. 16/126,556 filed with the US Patent and Trademark Office on Sep. 10, 2018, which claims the benefit of priority under 35 U.S.C. 119(e) to U.S. Application Ser. No. 62/556,993, flied on Sep. 11, 2017, and 62/587,817, filed on Nov. 17, 2017, both under the same title, by the same inventors as the subject application and incorporated herein by their reference.

BACKGROUND

Embodiments of the present invention relate generally to wireless communications, and more particularly, but not limited to, new types of communication formats and protocols for use in next generation wireless networks.

5G New Radio (NR) development is part of continuous mobile broadband evolution process to meet the requirements of 5G as outlined by IMT-2020, similar to earlier evolution of 3G & 4G wireless networks. 5G NR has the goal to provide wireless broadband to consumers with fiber-like performance at a significantly lower cost-per-bit than wired solutions. With new levels of latency, reliability, and security, 5G NR will scale to efficiently connect the massive Internet of Things (IoT), and will offer new types of mission-critical services. As part of NR development, new protocols and features are required to meet operational guidelines.

BRIEF DESCRIPTION OF THE DRAWINGS

Certain circuits, logic operation, apparatuses and/or methods will be described by way of non-limiting example only, in reference to the appended Drawing Figures in which:

FIG. 3 shows a simple block diagram example of SR collision with a control resource set (CORESET) for TDD system according to certain example embodiments of the invention;

FIG. 4 shows a simplified block diagram of an example of SR resource deactivation in a first option according to example embodiments of the invention;

FIG. 5 shows a simplified block diagram of an example of SR resource deactivation in a second option according to example embodiments of the invention;

DETAILED DESCRIPTION

Figure 1:
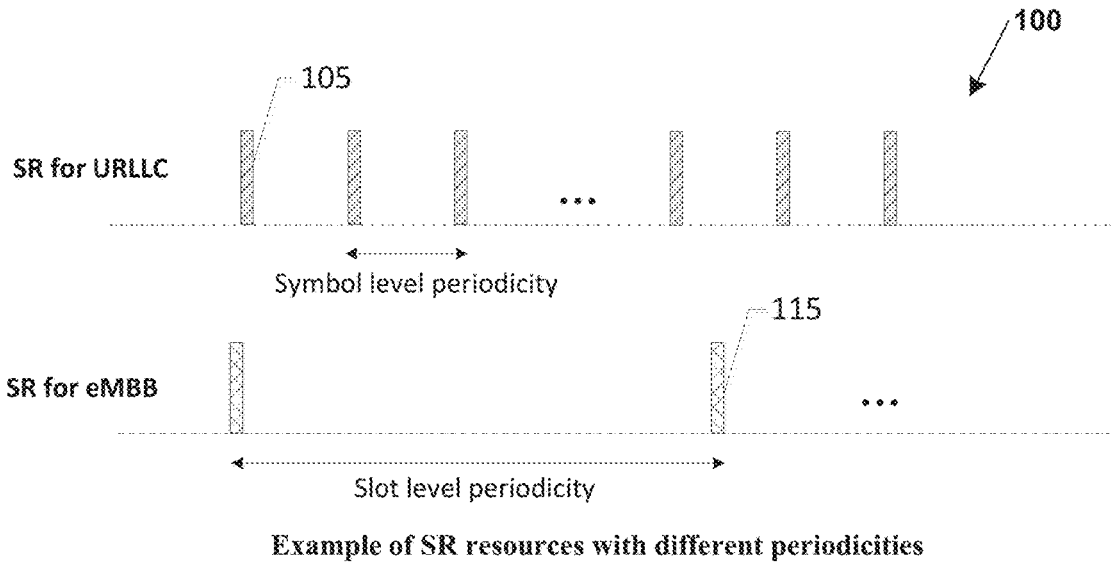
FIG. 1 shows a simplified block diagram of one example of scheduling request (SR) resources with different periodicities.

Next generation and mobile and radio systems, referred to herein as fifth generation (5G) systems, are anticipated to have certain network features, capabilities with the goal of providing a radio network architecture to connect every person and machine wirelessly. These 5G networks, can essentially be a combination of LTE advanced mobile radio access network (RAN), which connect user equipment (UE) with evolved NodeB (eNB) network access stations, and a new type of RAN, referred to as new radio (NR), some refer to as future radio access (FRA), which provides a more flexible, less centralized, lower latency access to information and sharing of data between UEs, sensors and a NR network access station, or next generation NodeB base station, referred to as gNodeB (gNB). NR is expected to be a unified network/system targeted to meet a variety of vastly different performance dimensions and services. Such diverse multi-dimensional requirements are driven by a need to support different services and applications. In general, NR will evolve based on 3GPP LTE-Advanced with additional New Radio Access Technologies ("RATs") to enrich people lives with improved, simple and seamless wireless connectivity solutions. NR will enable wireless connected world such as the Internet of Things (IoT) to deliver fast, rich content and services.

Three general use case models have been defined for 5G NR by 3GPP, including:
Enhanced Mobile Broadband (eMBB): data-driven use cases requiring high data rates across a wide coverage area;
Ultra Reliable Low Latency Communications (URLLC): strict requirements on latency and reliability for mission critical communications, such as remote surgery, autonomous vehicles or the Tactile Internet; and
Massive Machine Type Communications (mMTC): need to support a very large number of devices in a small area, which may only send data sporadically, such as Internet of Things (IoT) use cases.

eMBB and URLLC are designed to reliably provide a vast array of users end-to-end (E2E) connectivity having robust bandwidth with high reliability. withOne requirement for this connectivity is the ability for NR devices to have a robust uplink control mechanism to be able to send uplink control information (UCI) and other signaling to the gNB for proper and efficient operation in the NR RAN. By way of example, the UCI may include hybrid automatic repeat/request acknowledgments/non-acknowledgements (HARQ ACK/NACK), channel quality indicators, MIMO feedback such as Rank Indicator (RI) or Precoding Matrix Indicator (PMI), and scheduling requests (SR) for uplink transmission or related information for reporting and connectivity control. The embodiments of this disclosure focus on the SR mechanisms, UE behavior and activation and deactivation of SR configurations.

In LTE, such UCI may be transmitted in the uplink over either a physical uplink shared channel (PUSCH), if the UE is transmitting application data or radio resource control (RRC) signaling, or within a stand-alone uplink channel referred to as the physical uplink control channel (PUCCH), when no application data or RRC signaling is being transmitted. Though channel structures and performance may vary significantly between LTE and NR, the uplink control channel designs for NR are desirable to achieve a similar link budget as those of LTE. Notably, in an example NR system such as that described in 3GPP TR 38.912 version 14.0.0, Release 14, published as ETSI TR 138 912 V14.0.0 (May 2017), which is incorporated herein by its reference, multiple numerologies are supported in the physical layer. A numerology is defined by sub-carrier spacing and cyclic prefix (CP) overhead. Multiple subcarrier spacings can be derived by scaling a basic subcarrier spacing by an integer N. In this example, a maximum channel bandwidth per NR carrier is 400 MHz. Note that all details for channel bandwidth at least up to 100 MHz per NR carrier are to be specified in Rel-15. At least for single integer numerology cases, candidates of the maximum number of subcarriers per NR carrier is 3300 or 6600 though NR channel designs may potentially extend these parameters in later releases of the 3GPP specification and the inventive embodiments are not limited to any particular specific ranges. In this example NR TDD mode, a subframe duration is fixed to 1 ms and a frame length is 10 ms. Scalable numerology accordingly allows the flexibility of using at least from 15 kHz to 480 kHz subcarrier spacing. All numerologies with 15 kHz and larger subcarrier spacing, regardless of CP overhead, align on symbol boundaries every 1 ms in the NR carrier. Thus NR has the flexibility to use different subcarrier spacing compared to LTE and the uplink control channel utilized in NR must accommodate the various potential time resources, referred to as "slots" being utilized.

In various examples, a slot may be defined as 7 or 14 OFDM symbols for the same subcarrier spacing of up to 60 kHz with normal CP and as 14 OFDM symbols for the subcarrier spacing higher than 60 kHz with normal CP. A slot can contain all downlink, all uplink, or at least one downlink part and at least one uplink part. In NR, slot aggregation is supported, i.e., data transmission can be scheduled to span one or multiple slots. Moreover, slots can be further partitioned into "mini-slots" of 1 symbol (above 6 GHz) or aggregated up to a full slot-1 symbol if desired.

The NR use case families, eMBB and ultra-reliable and low latency communications (URLCC) have very different requirements in terms of user plane latency and required coverage levels. The key requirements for URLLC relate to U-plane latency and reliability. For URLLC the target for user plane latency should be 0.5 ms for UL, and 0.5 ms for DL, and the target for reliability should be $1-10^{-5}$ within 1 ms.

In some NR embodiments, a UE can be configured with multiple dedicated physical uplink control channel (PUCCH) resources for scheduling requests (SRs) and the resource can be mapped to priority or numerology/transmission time interval (TTI) of the logical channel (LCH) that triggered the SR. In addition, it has been settled that multi-bit SR is not supported for NR. The main motivation is to allow a gNB to identify services with different quality of service (QoS) requirements requested from UE.

Further, in some NR systems, an SR can be configured with a periodicity of at least equal to X OFDM symbol(s) (at least for short-PUCCH), and with up to the largest periodicity supported in LTE (e.g. 80 ms), where X=1 is considered as working assumption. The SR resource with shorter periodicity can be configured to target for low latency application, e.g., URLLC, in order to meet stringent latency requirement.

FIG. 1 illustrates different periodicities of SR resources 105, 115 targeting services with different QoS requirements. For low latency application, e.g., URLLC, a dedicated SR resource 105 with shorter periodicity can be configured. This indicates that for URLLC service, a UE may be configured with dedicated SR resources 105 with a symbol-level periodicity, in order to meet stringent latency requirement. For eMBB, however, a UE SR resource 115 can be configured with slot-level periodicity.

Figure 2:
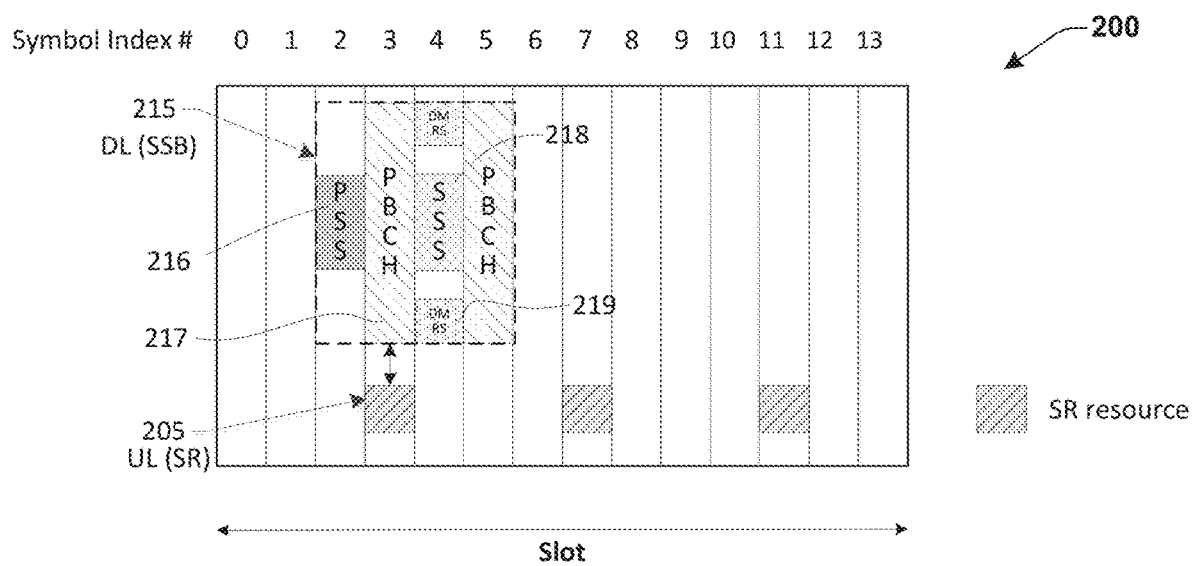
FIG. 2 shows a simple block diagram of an example of SR collision with synchronization signal blocks (SSBs) in a time division duplexing (TDD) system according to certain example embodiments of the invention.

Referring to FIG. 2, in case when the UE is configured with a symbol-level SR resource 205, depending on configured SR periodicity, SR resource 205 may collide with downlink data transmission 215 or other UL signal. For the former case, this can be problematic since it will introduce UL interference to DL transmission and degrade system level performance. To avoid this issue, various embodiments provide designs and mechanisms for SR transmission and resource configuration and, in particular, may include:

Defining UE behavior for SR transmission when the SR resource may collide with other signals; and/or Activation and/or deactivation of some SR resources in case of multiple SR configurations.

SR Resource Configuration

In some NR systems, a short PUCCH may span one or two symbol(s) while the long PUCCH may span any number of symbols from 4 to 14 within a slot. In NR, for a given UE, short PUCCH and long PUCCH can be multiplexed in a time division multiplexing (TDM) manner in the same slot.

The SR periodicity should be equal to or longer than the transmission duration of the PUCCH type configured to carry the SR. For instance, for SR with a '1' symbol periodicity, the short PUCCH with '1' symbol duration can be configured. For SR with '4' symbol periodicity, a short PUCCH with '1' or '2' symbol duration or long PUCCH with '4' symbol duration can be configured.

UE Behavior for SR Transmission if SR Collides with Other Signals

As mentioned above, when a UE is configured with a symbol-level SR resource, depending on configured SR periodicity, for dynamic TDD system, the SR resource may collide with downlink data transmission or other uplink (UL) signal. For the former case, this may not be desirable as it would introduce UL interference to the downlink (DL) transmission resulting in degraded system level performance. To address this issue, certain UE behavior needs to be defined when SR transmission collides with other signals.

In one embodiment, in the case of a TDD system, when configured SR resources collide with actual transmitted synchronization signal block(s) (SSBs), or a control resource set (CORESET), or the DL control region with maximum CORESET duration (e.g., 3 symbols in a slot) in time, the UE may skip the SR transmission entirely, to avoid collision.

In a modified embodiment, the UE may defer the SR transmission to the next available and valid opportunity, where the SR resource does not collide with other DL transmissions. In one option, the UE may derive which symbols are "UL" in a slot in one or more slots from slot format indication (SFI) carried by group common physical downlink control channel (PDCCH). Slot Format Indication (SFI) informs the UE whether an OFDM symbol is Downlink, Uplink or Flexible. SFI can indicate link direction over one or many slots (configured through radio resource control (RRC)). The SFI carries an index to a pre-configured UE-specific table (configured through RRC). SFI can be either: (i) Dynamic (i.e. through a DCI)—UE assumes there is no conflict between dynamic SFI and DCI DUUL assignments; or (ii) Static or semi-static (i.e. through RRC). Based on this information, the UE can determine whether the next SR resource is a valid opportunity or in the UL symbols.

FIG. 2 illustrates an example symbol-level diagram 200 of a SR resource 205 collision with a synchronization signal block (SSB) 215 in a TDD system. In NR, the SSB 215 is a DL physical (PHY) layer signaling and may include a primary synchronization signal (PSS) 216, a secondary synchronization signal (SSS) 218 and the physical broadcast channel (PBCH) 217. The SSB 215 may further include a PBCH demodulation reference signal (DMRS). In example 200, an SR 205 with 4-symbol periodicity is configured and shown for a TDD system. As can be seen, SR resource 205 in symbol #3 will collide with SSB 215. If the UE intends to request an uplink data transmission by sending a SR 205, the UE may skip the SR 205 at symbol #3 to avoid interference with the DL signal, SSB 215. The UE may defer the SR transmission 205 to symbol #7 instead, if symbol #7 is a valid SR opportunity.

FIG. 3 illustrates another example 300 of SR 305 collision with the control resource set (CORESET) 315 in a TDD system. In NR, the control resource set (CORESET) is defined as a set of REGs under a given numerology. It is UE-specific and configured by higher-layer signaling which defines its frequency-domain resources, the starting OFDM symbol (i.e., OFDM symbol #0, #1 or #2), and its duration. Any CORSET has a time duration maximum of 3 OFDM symbols.

In example 300, CORESET 315 is configured over the first three symbols, i.e., symbols #0-#2 and SR 305 has a 4-symbol periodicity. As shown, SR resource 305 in symbol #2 collides with CORESET 315. In this example, the UE may not transmit SR 305 in symbol #2 and may defer the SR transmission to symbol #6 if symbol #6 is a valid SR opportunity.

In some embodiments, NR includes slot format information (SFI) carried by group common PDCCH, which can be used to indicate which symbols in one or more slots are "DL", "UL", or "unknown" symbols. For "unknown" symbols, the UE should not assume anything for transmission or reception. After successfully decoding group common PDCCH, a UE can derive the DL slots symbols and use an unknown portion of one slot in one or more slots. In case when SR resource collides with DL and unknown symbols in time, UE would skip the SR transmission or defer the SR transmission to the next available and valid SR opportunity.

In some embodiments, the DL/UL direction assignment is configured semi-statically, including "flexible" resources (e.g., symbols or symbol-groups) that can be switched between DL and UL based on Layer 2 or Layer 1 signaling (e.g., DCI, SFI in group-common PDCCH). In case a configured SR transmission opportunity collides with either DL or unknown symbols (if the latter is also semi-statically configured) in time, the UE will skip the SR transmission or defer the SR transmission to the next available and valid SR opportunity.

In other embodiments, NR, reserved resources can be configured by higher layers to ensure forward compatibility. In present specifications, the UE should not assume anything on transmission or reception on the reserved resources. In this case, when SR collides with reserved resources in time, UE may skip the SR transmission or defer the SR transmission to the next available and valid SR opportunity Note that the above mechanisms may fairly easily be configured for the case when a UE sounding reference signal (SRS) collides with DL signals or unknown symbol or reserved resources as well.

In other embodiments, in case when a SR resource collides with other UL signals including physical uplink shared channel (PUSCH), physical uplink control channel (PUCCH) carrying other uplink control information (UCI) type, or sounding reference signal (SRS), the UE may transmit one of the SR or the other signals depending on a priority rule selected. For example, in one option, UE or use mode where the SR has a shorter periodicity, they should have the highest priority. In this case, UE may transmit SR while skip the transmission of other UL signals. In another option, SR with longer periodicity may have lower priority than SRS.

Activation/Deactivation of SR Resources for Multiple SR Configurations

In some embodiments, SR resource configurations can be activated and/or deactivated to ensure better forward compatibility and more efficient support in a dynamic time division duplex (TDD) system. In particular, semi-static SR resources can be configured by higher layers. Further, L1 or L2 signaling can be employed to dynamically activate or deactivate (allocate or de-allocate) the semi-statically configured SR resources. It should be understood that L1 signaling may be based on UE specific or group or cell specific signaling, e.g., UE specific downlink control information (DCI), group common DCI or group common PDCCH. In addition, L2 signaling may be based on the medium access layer-control element (MAC-CE).

In the case when multiple SR resources are configured for a given UE, L1 or L2 signaling may be used to dynamically activate/deactivate some of the SR resources, to release a given SR resource on a need-basis and reduce the overhead for UL transmission, particularly for symbol-level SR resources. In the slots where symbol-level SR resources are configured, slot-based scheduling of DL data transmission may not be feasible. Deactivation of symbol-level SR resources may help to improve system level spectrum efficiency at least for DL transmission.

Embodiments of activation/deactivation of SR resources in case of multiple SR configurations will now be described in reference to FIGS. 4 and 5. In specific embodiments where multiple SR configurations may be utilized, one or more SR resource configurations among the configured SR resources can be dynamically activated/deactivated using L1 or L2 signaling. For example, a SR resource index or a bitmap of SR resource configurations may be included in L1 or L2 signaling for dynamic modification of the corresponding SR resources. Here, activation/deactivation of SR resource configurations may preferably include configurations for time-offset and periodicity corresponding to the configured PUCCH type, i.e., formats '1' '3' and '4' for long PUCCH (4-14 symbols) or formats '0' and '2' for short PUCCH (1-2 symbols).

In the example when a bitmap is used for SR resource tracking and activation/deactivation, each bit may correspond to one SR resource configuration. In some embodiments, the order of SR resource configurations may be configured by radio resource control (RRC) signaling. For example, bit '1' may indicate the corresponding SR resource is activated while bit '0' might indicate the corresponding SR resource is deactivated.

FIG. 4 illustrates one example 400 of SR resource deactivation according to certain inventive embodiments. In example 400, two different SR resource configurations, or "profiles" 405 and 410 are provided to a UE by higher layers and adaptable via RRC signaling. In this example 400, a first SR resource profile 405, is configured for the UE having a symbol-level periodicity, targeted toward URLLC application usage. Further, a second SR resource profile 410 may be configured for the UE having a slot-level periodicity, or reduced frequency of SRs available, for use by the UE in, for example, eMBB-related applications. As shown, the first profile SR resources 405 may be deactivated, for example when URLLC applications are not active in the UE, using L1 or L2 signaling, in order to reduce UL overhead and signaling not necessary or presently desired for UE operation.

In other embodiments, as shown by the example 500 of FIG. 5, certain of the SR resources 505, 510 configured for a UE may be dynamically activated or deactivated as suitably desired to support UE operation in a current mode of use or operation. For example, in another option, an activation/deactivation pattern of SR resources can be used to ensure sufficient transmission opportunities while maintaining efficient overhead in UL signaling. The SR activation/deactivation pattern or patterns in some embodiments, may be predefined in the specification or configured by higher layers via NR minimum system information (MSI), NR remaining minimum system information (RMSI), NR other system information (OSI) or radio resource control (RRC) signaling. For instance, a bitmap may be used to indicate which portion of SR resources is deactivated or activated.

FIG. 5 illustrates one example 500 of SR resource deactivation with odd time index is deactivated, which indicates that SR periodicity is doubled.

Configuration of SR occasions with a given periodicity according to numerologies of subcarrier spacing are shown in Table 1 as follows:

TABLE 1

| Subcarrier spacing (kHz) | Supported periodicities [ms] |
| --- | --- |
| 15 | 2 symbols, 7 symbols, 1, 2, 5, 10, 20, 40, 80 |
| 30 | 2 symbols, 7 symbols, 0.5, 1, 2, 5, 10, 20, 40, 80 |
| 60 | 2 symbols, 7 symbols (6 symbols for ECP), 0.25, 0.5, 1, 2, 5, 10, 20, 40, 80 |
| 120 | 2 symbols, 7 symbols, 0.125, 0.25, 0.5, 1, 2, 5, 10, 20, 40, 80 |

These periodicities each indicate how frequently a UE may trigger SR transmission within configured PUCCH resources. If the periodicity is a multiple of slots, then additional slot offset relative to a reference slot (e.g. SFN=0) needs to be configured. Within a slot, a particular SR occasion may be indicated as a part of PUCCH resource configuration. If the periodicity is less than a slot, then it could be handled as a part PUCCH resource configuration for a slot.

In one embodiment, resource configuration for PUCCH formats carrying SR comprise a bitmap over slot symbols wherein each bit in the bitmap indicates a starting symbol position of PUCCH SR occasion within a slot. For example, the following bitmap corresponds to PUCCH format occasions within 14-symbols slot on symbol indices 2, 6, and 10, where the index begins at 0:

Bitmap=0 0 1 0 0 0 1 0 0 0 1 0 0 0

If there is a lesser number of UL symbols in the slot, then the bitmap may be truncated to fit to the configured number of symbols.

If the configured SR periodicity corresponds to a smaller number of SR occasions than the number of configured occasions, the UE may need to be configured with an offset or another bitmap to calculate particular SR occasions to be used for transmission. In an example, if PUCCH format carrying SR and HARQ-ACK is allocated every '2' symbols in symbols #0, 2, 4, 6, 8, 10, 12 then another bitmap of size 7 may indicate which particular occasions are allowed for SR transmission. Then, in order to activate occasions 0, 4, and 8 for SR transmission, a bitmap [1 0 1 0 1 0 0] may be used where each bit corresponds to each PUCCH format occasion and '1' indicates that particular PUCCH format occasion is allowed for SR transmission. Alternatively, a set of offsets in terms of PUCCH occasions can be configured. A further option is to configure an offset and a period in terms of symbols or PUCCH format occasions. Finally, a UE may just take any configured PUCCH format occasion for SR transmission once SR is triggered by higher layer periodicity timer.

It can be seen that the values of sub-slot periodicity (less than 14 symbols for no cyclic prefix (NCP) and 12 symbols for enhanced cyclic prefix (ECP) are selected to fit an integer number of times to the slot. However, additional periodicities may be introduced.

In other embodiments, PUCCH format carrying SR follows SR periodicity and offset. In an example, SR is configured with 2-symbol periodicity, i.e., in symbol #0, 2, 4, 6, 8, 10, 12. In this case, PUCCH can be transmitted starting from symbol #0, 2, 4, 6, 8, 10, 12. In this case, starting symbol is fixed to 0 for PUCCH resource configuration. Alternatively, the PUCCH resource configuration only includes the PUCCH duration and the starting symbol is determined by the SR opportunities configured using the SR periodicity and offsets. The SR opportunities can be defined as described above using different combinations of slot-level periodicities and offsets, and bitmaps within a slot duration.

In another option, the starting symbol can be configured as a part of PUCCH resource for SR. In an example, SR is configured with 2-symbol periodicity, i.e., in symbol #0, 2, 4, 6, 8, 10, 12. Further, the starting symbol in PUCCH resource is '1.' In this case, PUCCH can be transmitted starting from symbol #1, 3, 5, 7, 9, 11, 13.

In other embodiments, in a case when PUCCH duration exceeds the configured SR periodicity or exceeds the slot boundary, the UE may drop the PUCCH carrying SR.

In other embodiments, the set of SR periodicities may be further extended by additional values. For ECP case, both 3 and 4 symbol periodicity are proposed to be included since they fit integer number of times to 12 symbols.

Moreover, the alignment within the slot is strictly not required. The periodicity may slightly break when crossing the slot boundary in order to achieve the same SR resource position within the slot. In that sense, even finer granularity of SR periodicities may be achieved. Therefore, 3- and 4-symbol SR periodicity values for the normal CP case as well, i.e. 4 or 3 SR occasions per slot. It can be included also as "⅓ slot" and "¼ slot" periodicity.

Figure 6:
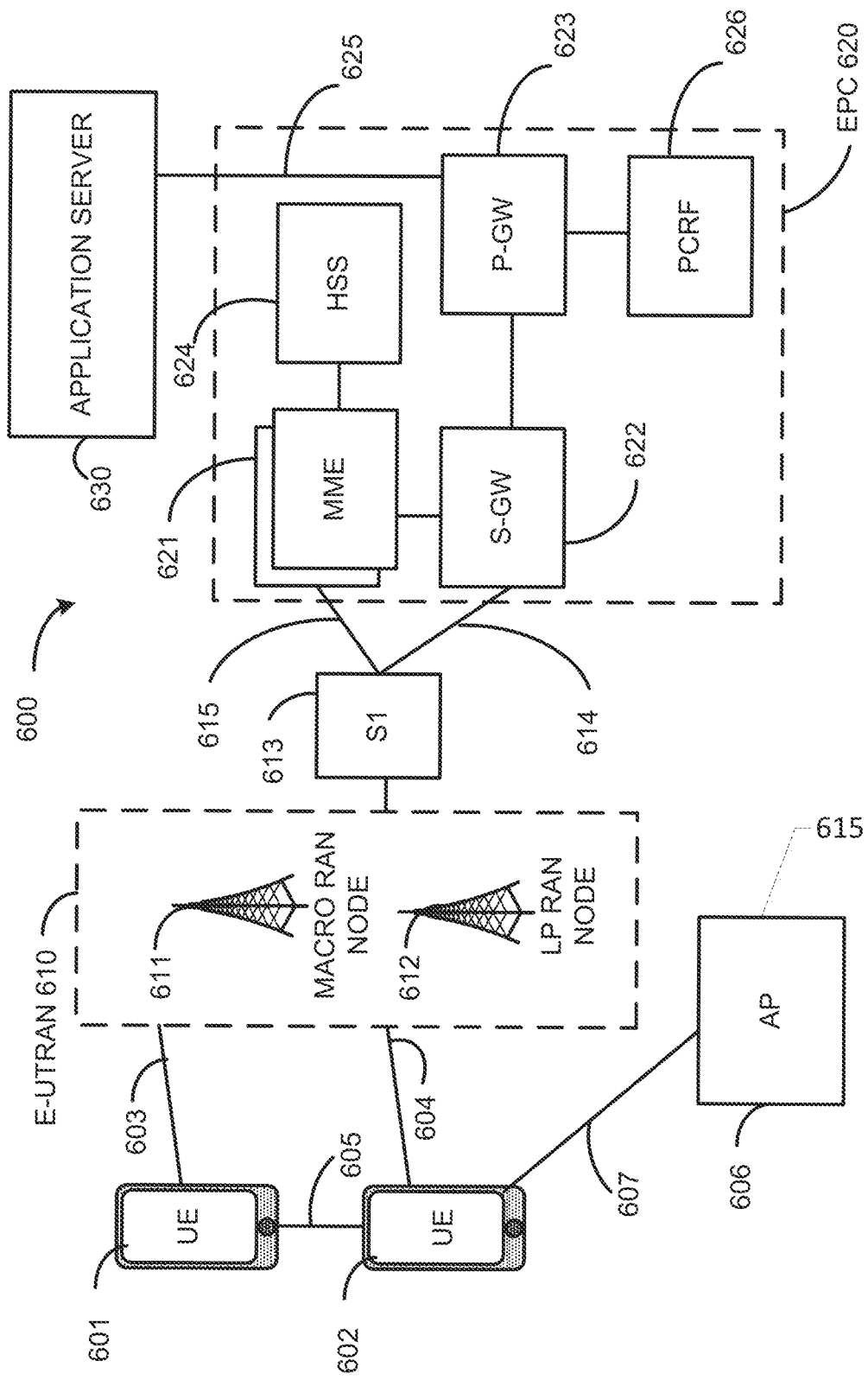
FIG. 6 shows a basic block diagram of a network with control messaging and scheduling request handling according to various embodiments of the invention.

FIG. 6 illustrates an architecture of a system 600 of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi®) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602. In the PDCCH, the gNB or eNB sets the SR configuration for UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 interface 613. In embodiments, the CN 620 may be an evolved packet core (EPC) network, a NextGen Packet Core (NPC) network, or some other type of CN. In this embodiment the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Enforcement Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7:
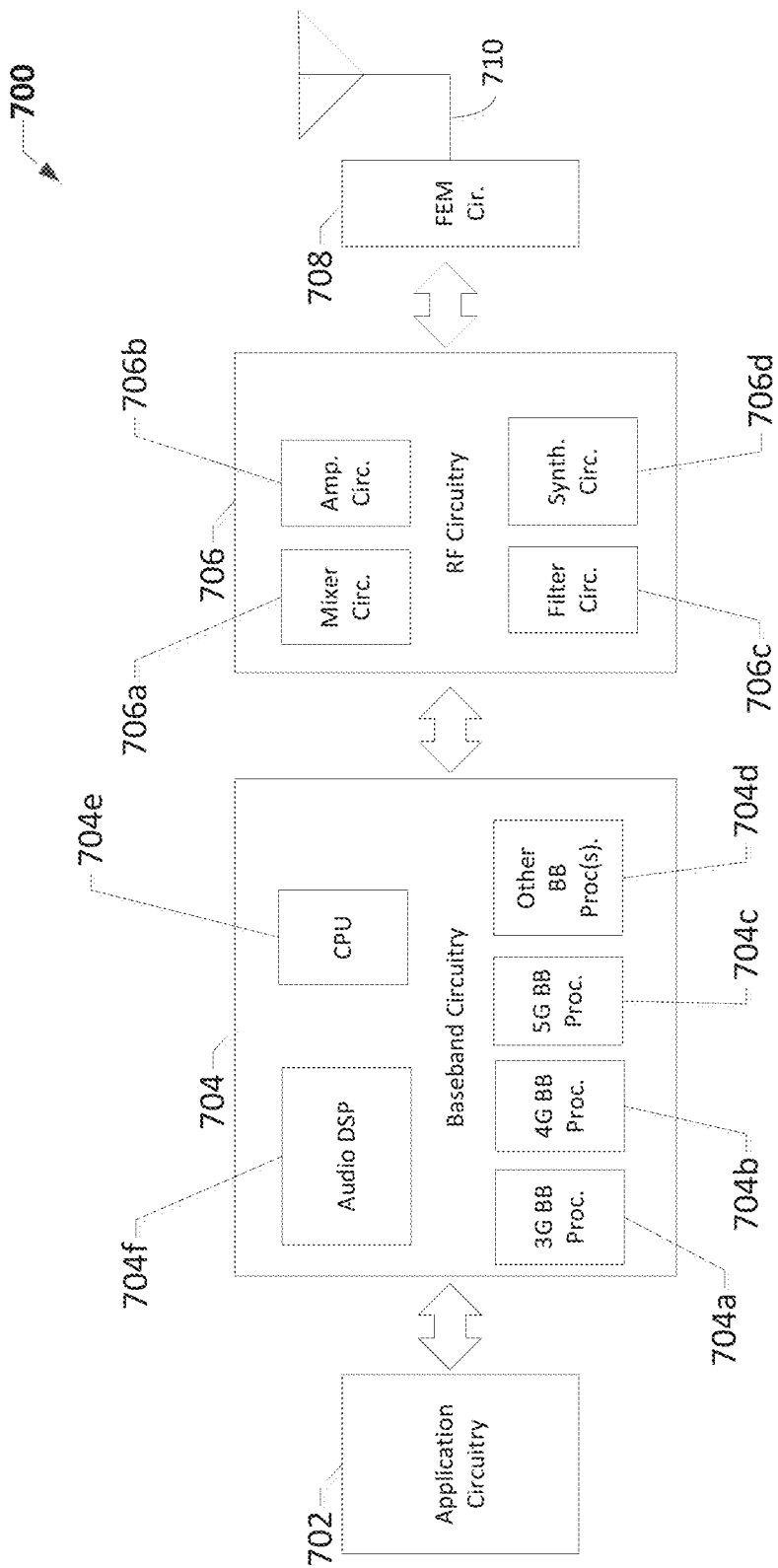
FIG. 7 shows a simplified block diagram of an electronic device using scheduling requests according to some inventive embodiments.

Embodiments described herein may be implemented into a system using any suitably configured hardware and/or software. FIG. 7 illustrates, for one embodiment, example components of an electronic device 700. In embodiments, the electronic device 700 may be, implement, be incorporated into, or otherwise be a part of a user equipment (UE) or network access station such as a gNB. In some embodiments, the electronic device 700 may include application circuitry 702, baseband circuitry 704, Radio Frequency (RF) circuitry 706, front-end module (FEM) circuitry 708 and one or more antennas 710, coupled together at least as shown. In embodiments where the electronic device 700 is implemented in or by a NR gNB, the electronic device 700 may also include network interface circuitry (not shown) for communicating over a wired interface (for example, an X2 interface, an S1 interface, and the like).

The application circuitry 702 may include one or more application processors or processing units. For example, the application circuitry 702 may include circuitry such as, but not limited to, one or more single-core or multi-core processors 702a. The processor(s) 702a may include any combination of general-purpose processors and dedicated processors (e.g., graphics processors, application processors, etc.). The processors 702a may be coupled with and/or may include computer-readable media 702b (also referred to as "CRM 702b", "memory 702b", "storage 702b", or "memory/storage 702b") and may be configured to execute instructions stored in the CRM 702b to enable various applications and/or operating systems to run on the system and/or enable features of the inventive embodiments to be enabled.

The baseband circuitry 704 may include circuitry such as, but not limited to, one or more single-core or multi-core processors to arrange, configure, process, generate, transmit, receive, or otherwise utilize an NR PUCCH having multiple SR opportunities and periodicities as described in various embodiments herein. The baseband circuitry 704 may include one or more baseband processors and/or control logic to process baseband signals received from a receive signal path of the RF circuitry 706 and to generate baseband signals for a transmit signal path of the RF circuitry 706. Baseband circuitry 704 may interface with the application circuitry 702 for generation and processing of the baseband signals and for controlling operations of the RF circuitry 706. For example, in some embodiments, the baseband circuitry 704 may include a third generation (3G) baseband processor 704a, a fourth generation (4G) baseband processor 704b, a fifth generation (5G)/NR baseband processor 704c, and/or other baseband processor(s) 704d for other existing generations, generations in development or to be developed in the future (e.g., 6G, etc.). The baseband circuitry 704 (e.g., one or more of baseband processors 704a-d) may handle various radio control functions that enable communication with one or more radio networks via the RF circuitry 706. The radio control functions may include, but are not limited to, signal modulation/demodulation, encoding/decoding, radio frequency shifting, and the like. In some embodiments, modulation/demodulation circuitry of the baseband circuitry 704 may include Fast-Fourier Transform (FFT), precoding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 704f. The audio DSP(s) 704f may include elements for compression/decompression and echo cancellation and may include other suitable processing elements in other embodiments. The baseband circuitry 704 may further include computer-readable media 704g (also referred to as "CRM 704g", "memory 704g", "storage 704g", or "CRM 704g"). The CRM 704g may be used to load and store data and/or instructions for operations performed by the processors of the baseband circuitry 704. CRM 704g for one embodiment may include any combination of suitable volatile memory and/or non-volatile memory. The CRM 704g may include any combination of various levels of memory/storage including, but not limited to, read-only memory (ROM) having embedded software instructions (e.g., firmware), random access memory (e.g., dynamic random access memory (DRAM)), cache, buffers, etc.). The CRM 704g may be shared among the various processors or dedicated to particular processors. Components of the baseband circuitry 704 may be suitably combined in a single chip, a single chipset, or disposed on a same circuit board in some embodiments. In some embodiments, some or all of the constituent components of the baseband circuitry 704 and the application circuitry 702 may be implemented together, such as, for example, on a system on a chip (SOC).

In some embodiments, the baseband circuitry 704 may provide for communication compatible with one or more radio technologies. For example, in some embodiments, the baseband circuitry 704 may support communication with an E-UTRAN, NR and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc., to facilitate the communication with the wireless network. RF circuitry 706 may include a receive signal path that may include circuitry to down-convert RF signals received from the FEM circuitry 708 and provide baseband signals to the baseband circuitry 104. RF circuitry 706 may also include a transmit signal path that may include circuitry to up-convert baseband signals provided by the baseband circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In some embodiments, the mixer circuitry 706a of the receive signal path and the mixer circuitry 706a of the transmit signal path may include two or more mixers and may be arranged for quadrature downconversion and/or upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a of the transmit signal path may be arranged for direct downconversion and/or direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706*d* may be a fractional-N synthesizer or a fractional N/N+1 synthesizer, although the scope of the embodiments is not limited in this respect, as other types of frequency synthesizers may be suitable. For example, synthesizer circuitry 706*d* may be a delta-sigma synthesizer, a frequency multiplier, or a synthesizer comprising a phase-locked loop with a frequency divider. The synthesizer circuitry 706*d* may be configured to synthesize an output frequency for use by the mixer circuitry 706*a* of the RF circuitry 706 based on a frequency input and a divider control input. In some embodiments, the synthesizer circuitry 106*d* may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 depending on the desired output frequency. In some embodiments, a divider control input (e.g., N) may be determined from a look-up table based on a channel indicated by the application circuitry 702.

Synthesizer circuitry 706*d* of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path that may include circuitry configured to operate on RF signals received from one or more antennas 710, amplify the received signals and provide the amplified versions of the received signals to the RF circuitry 706 for further processing. FEM circuitry 708 may also include a transmit signal path that may include circuitry configured to amplify signals for transmission provided by the RF circuitry 706 for transmission by one or more of the one or more antennas 710. In some embodiments, the FEM circuitry 708 may include a TX/RX switch to switch between transmit mode and receive mode operation. The FEM circuitry 708 may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the electronic device 700 may include additional elements such as, for example, a display, a camera, one or more sensors, and/or interface circuitry (for example, input/output (I/O) interfaces or buses) (not shown). In embodiments where the electronic device is implemented in or by an eNB, the electronic device 700 may include network interface circuitry. The network interface circuitry may be one or more computer hardware components that connect electronic device 700 to one or more network elements, such as one or more servers within a core network or one or more other eNBs via a wired connection. To this end, the network interface circuitry may include one or more dedicated processors and/or field programmable gate arrays (FPGAs) to communicate using one or more network communications protocols such as X2 application protocol (AP), S1 AP, Stream Control Transmission Protocol (SCTP), Ethernet, Point-to-Point (PPP), Fiber Distributed Data Interface (FDDI), and/or any other suitable network communications protocols.

Figure 8:
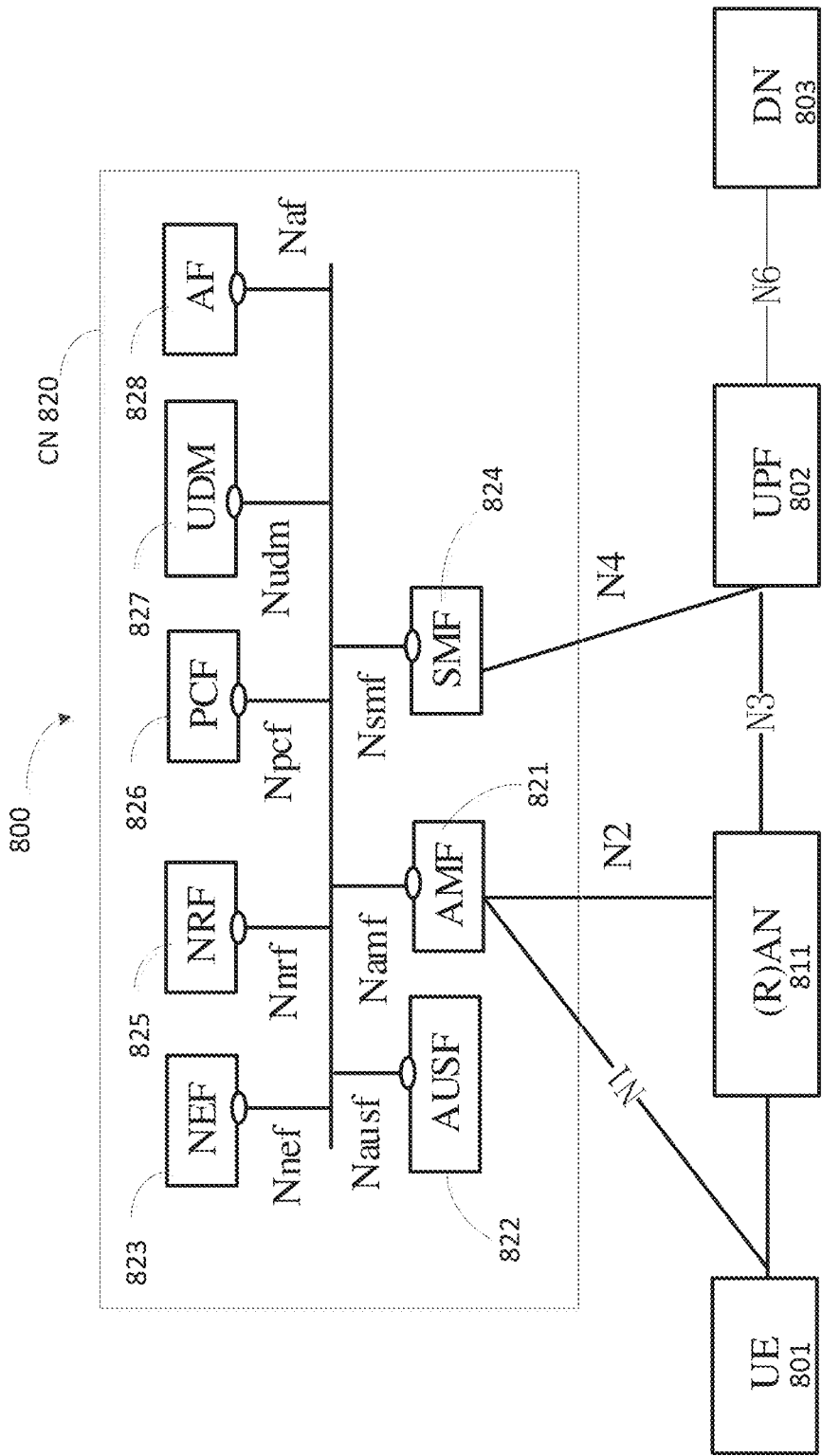
FIG. 8 illustrates an architecture of a system of a network using SR allocations according to various alternative embodiments of the invention.

FIG. 8 illustrates an architecture of a system 800 of a network in accordance with some embodiments. The system 800 is shown to include a UE 801, which may be the same or similar to UEs 601 and 602 discussed previously; a RAN node 811, which may be the same or similar to RAN nodes 611 and 612 discussed previously; a User Plane Function (UPF) 802; a Data network (DN) 803, which may be, for example, operator services, Internet access or 3rd party services; and a 5G Core Network (5GC or CN) 820.

The CN 820 may include an Authentication Server Function (AUSF) 822; a Core Access and Mobility Management Function (AMF) 821; a Session Management Function (SMF) 824; a Network Exposure Function (NEF) 823; a Policy Control function (PCF) 826; a Network Function (NF) Repository Function (NRF) 825; a Unified Data Management (UDM) 827; and an Application Function (AF) 828. The CN 820 may also include other elements that are not shown, such as a Structured Data Storage network function (SDSF), an Unstructured Data Storage network function (UDSF), and the like.

The UPF 802 may act as an anchor point for intra-RAT and inter-RAT mobility, an external PDU session point of interconnect to DN 803, and a branching point to support multi-homed PDU session. The UPF 802 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 802 may include an uplink classifier to support routing traffic flows to a data network. The DN 803 may represent various network operator services, Internet access, or third party services. NY 803 may include, or be similar to application server 630 discussed previously.

The AUSF 822 may store data for authentication of UE 801 and handle authentication related functionality. The AUSF 822 may facilitate a common authentication framework for various access types.

The AMF 821 may be responsible for registration management (e.g., for registering UE 801, etc.), connection management, reachability management, mobility management, and lawful interception of AMF-related events, and access authentication and authorization. AMF 821 may provide transport for SM messages between and SMF 824, and act as a transparent proxy for routing SM messages. AMF 821 may also provide transport for short message service (SMS) messages between UE 801 and an SMS function (SMSF) (not shown by FIG. 8). AMF 821 may act as Security Anchor Function (SEA), which may include interaction with the AUSF 822 and the UE 801, receipt of an intermediate key that was established as a result of the UE 801 authentication process. Where USIM based authentication is used, the AMF 821 may retrieve the security material from the AUSF 822. AMF 821 may also include a Security Context Management (SCM) function, which receives a key from the SEA that it uses to derive access-network specific keys. Furthermore, AMF 821 may be a termination point of RAN CP interface (N2 reference point), a termination point of NAS (N1) signalling, and perform NAS ciphering and integrity protection.

AMF 821 may also support NAS signalling with a UE 801 over an N3 interworking-f unction (IWF) interface. The N3IWF may be used to provide access to untrusted entities. N33IWF may be a termination point for the N2 and N3 interfaces for control plane and user plane, respectively, and as such, may handle N2 signalling from SMF and AMF for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS (N1) signalling between the UE 801 and AMF 821, and relay uplink and downlink user-plane packets between the UE 801 and UPF 802. The N3IWF also provides mechanisms for IPsec tunnel establishment with the UE 801.

The SMF 824 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to L1 System); termination of SM parts of NAS messages; downlink Data Notification; initiator of AN specific SM information, sent via AMF over N2 to AN; determine SSC mode of a session. The SMF 824 may include the following roaming functionality: handle local enforcement to apply QoS SLAs (VPLMN); charging data collection and charging interface (VPLMN); lawful intercept (in VPLMN for SM events and interface to L1 System); support for interaction with external DN for transport of signalling for PDU session authorization/authentication by external DN.

The NEF 823 may provide means for securely exposing the services and capabilities provided by 3GPP network functions for third party, internal exposure/re-exposure, Application Functions (e.g., AF 828), edge computing or fog computing systems, etc. In such embodiments, the NEF 823 may authenticate, authorize, and/or throttle the AFs. NEF 823 may also translate information exchanged with the AF 828 and information exchanged with internal network functions. For example, the NEF 823 may translate between an AF-Service-Identifier and an internal 5GC information. NEF 823 may also receive information from other network functions (NFs) based on exposed capabilities of other network functions. This information may be stored at the NEF 823 as structured data, or at a data storage NF using a standardized interfaces. The stored information can then be re-exposed by the NEF 823 to other NFs and AFs, and/or used for other purposes such as analytics.

The NRF 825 may support service discovery functions, receive NF Discovery Requests from NF instances, and provide the information of the discovered NF instances to the NF instances. NRF 825 also maintains information of available NF instances and their supported services.

The PCF 826 may provide policy rules to control plane function(s) to enforce them, and may also support unified policy framework to govern network behaviour. The PCF 826 may also implement a front end (FE) to access subscription information relevant for policy decisions in a UDR of UDM 827.

The UDM 827 may handle subscription-related information to support the network entities' handling of communication sessions, and may store subscription data of UE 801. The UDM 827 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 826. UDM 827 may also support SMS management, wherein an SMS-FE implements the similar application logic as discussed previously.

The AF 828 may provide application influence on traffic routing, access to the Network Capability Exposure (NCE), and interact with the policy framework for policy control. The NCE may be a mechanism that allows the 5GC and AF 828 to provide information to each other via NEF 823, which may be used for edge computing implementations. In such implementations, the network operator and third party services may be hosted close to the UE 801 access point of attachment to achieve an efficient service delivery through the reduced end-to-end latency and load on the transport network. For edge computing implementations, the 5GC may select a UPF 802 close to the UE 801 and execute traffic steering from the UPF 802 to DN 803 via the N6 interface. This may be based on the UE subscription data, UE location, and information provided by the AF 828. In this way, the AF 828 may influence UPF (re)selection and traffic routing. Based on operator deployment, when AF 828 is considered to be a trusted entity, the network operator may permit AF 828 to interact directly with relevant NFs.

As discussed previously, the CN 820 may include an SMSF, which may be responsible for SMS subscription checking and verification, and relaying SM messages to/from the UE 801 to/from other entities, such as an SMS-GMSC/IWMSC/SMS-router. The SMS may also interact with AMF 821 and UDM 827 for notification procedure that the UE 801 is available for SMS transfer (e.g., set a UE not reachable flag, and notifying UDM 827 when UE 801 is available for SMS).

The system 800 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 800 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an N5 reference point may be between the PCF and the AF; an N7 reference point may be between the PCF and the SMF; an N11 reference point between the AMF and SMF; etc. In some embodiments, the CN 820 may include an Nx interface, which is an inter-CN interface between the MME (e.g., MME 621) and the AMF 821 in order to enable interworking between CN 820 and CN 620.

Although not shown by FIG. 8, system 800 may include multiple RAN nodes 811 wherein an Xn interface is defined between two or more RAN nodes 811 (e.g., gNBs and the like) that connecting to 5GC 820, between a RAN node 811 (e.g., gNB) connecting to 5GC 820 and an eNB (e.g., a RAN node 611 of FIG. 6), and/or between two eNBs connecting to 5GC 820.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 801 in a connected mode (e.g., CM-CONNECTED) including functionality to manage the UE mobility for connected mode between one or more RAN nodes 811. The mobility support may include context transfer from an old (source) serving RAN node 811 to new (target) serving RAN node 811; and control of user plane tunnels between old (source) serving RAN node 811 to new (target) serving RAN node 811.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 9:
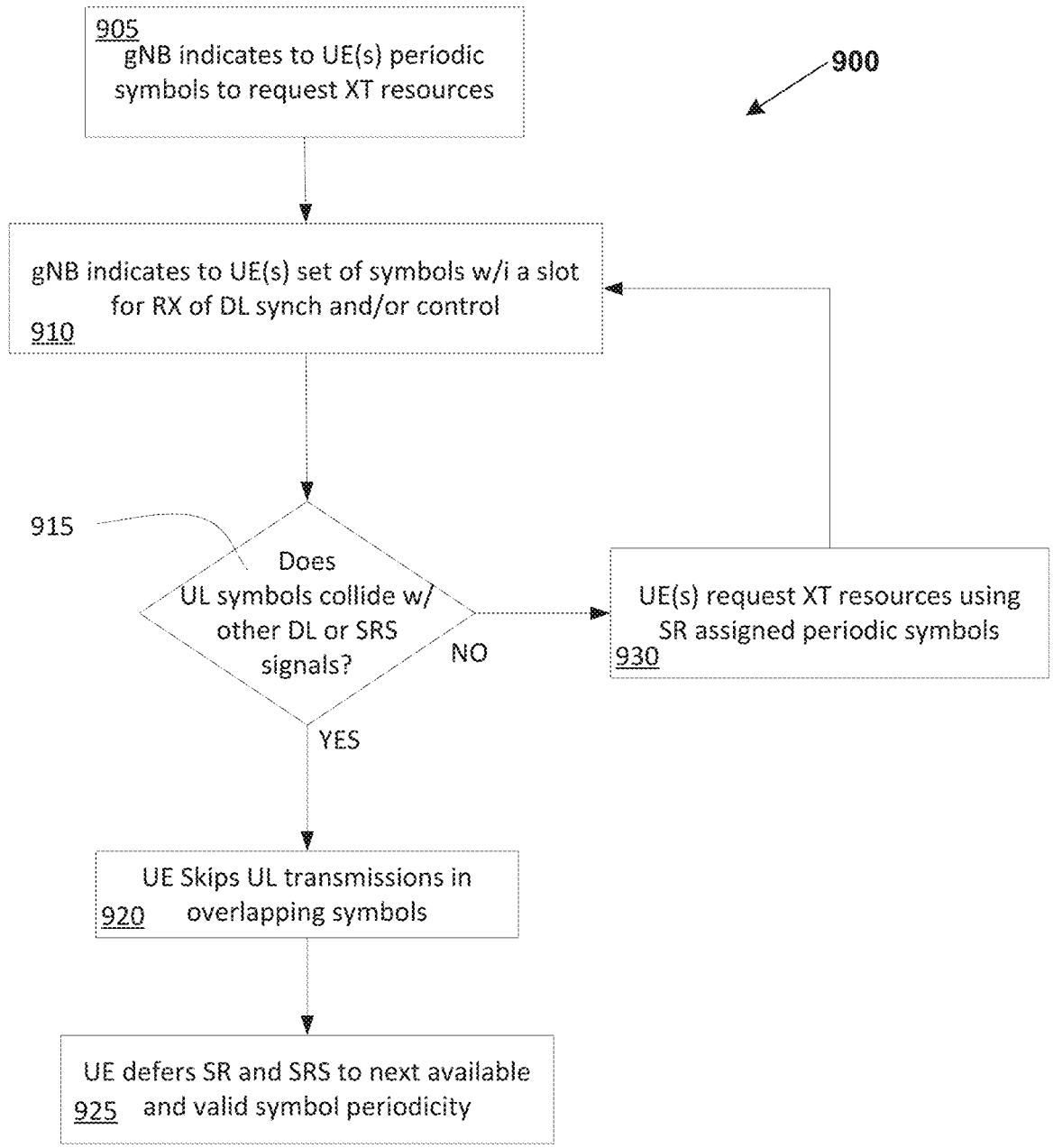
FIG. 9 shows a basic flow diagram of an example method of operation in a 5G NR network utilizing scheduling requests and configurations according to various embodiments of the present invention.

FIG. 9 shows a flow diagram 900 of an example method of communication in a 5G NR network according to various inventive embodiments and may generally include a network access station, such as a gNB, identifying 905 to a UE, an indication of the symbols the UE should use as sub-slot periodicity for requesting UL resources, e.g., symbols when SRs may be transmitted by the UE, and in certain embodiments, how the SRs are transmitted, e.g., as part of PUCCH information.

As mentioned earlier, the SR starting symbol can be configured as a part of the PUCCH resource. For example, an SR configured with 2-symbol periodicity, where the SR is transmitted in symbol #0, 2, 4, 6, 8, 10, 12, and the starting symbol in PUCCH resource is 1. In this case, the PUCCH can be transmitted with the SR starting at symbol #1 and reoccurring at symbol #s 3, 5, 7, 9, 11, 13. When PUCCH duration exceeds the configured SR periodicity or exceeds the slot boundary, UE may drop the PUCCH carrying SR.

The gNB also provides 910, simultaneously as part of the PDCCH, or separately in higher layer signaling, an indication to a UE, and the UE receiving, a set of symbols in a slot of a TDD frame for reception of DL control signals, e.g., symbols for receiving synchronization blocks (SSBs) and/or the CORESET. The UE determines 915 if there is any overlap of the indication of the set of symbols for DL information with its configuration for providing UL information, e.g., SRs, SRS, PUCCH, PUSCH, PRACH. If 915 it is determined there is overlap between UL and DL signals, the UE skips sending its UL information, including SRs, on overlapping symbols.

The gNB may indicate 905 the SR periodicity and starting symbol in downlink control information (DCI) to the user equipment. A UE configured with a symbol-level SR resource may collide with downlink data transmission or other uplink (UL) signal such as a sounding reference signal (SRS) resulting in degraded system level performance.

When an overlap of the SR resources will collide with actual transmitted synchronization signal block(s) (SSBs), or a control resource set (CORESET), or the DL control region with maximum CORESET duration (e.g., 3 symbols in a slot) in time, the UE may skip 920 the SR transmission. Furthermore, the UE may defer 925 the SR transmission to the next available and valid opportunity, where the SR resource does not collide with other UL/DL transmissions. For example, the UE may derive which symbols are "UL" in a slot in one or more slots from slot format indication (SFI) carried by group common physical downlink control channel (PDCCH) to know whether a given OFDM symbol is Downlink, Uplink or Flexible. Based on this information, the UE can determine whether the next SR resource is a valid opportunity to defer the SR. If the SR configuration requires adapting, method 900 returns to the beginning where UE identifies or derives the SR configuration based on information from the gNb.

Example Embodiments

In a First Example embodiment, a communication device for a 5G new radio (NR) wireless network having user equipment (UE) and a next generation node base station (gNB) is disclosed which includes a memory configured to store information relating to symbols of time division duplex frames for transmission and reception by the UE, the information including indicia of configured scheduling request (SR) resources having potentially both slot-level and symbol-level periodicities; and a processing unit configured to prepare schedule request (SR) transmissions at periods according to the stored indicia, wherein the processing unit is configured to skip an SR transmission that would collide at a common TDD symbol with downlink signals being received at the common TDD symbol.

In a Second Example embodiment, the First Example is furthered by the skipped SR transmission is deferred to a next available TDD symbol.

In a Third Example embodiment, the First Example is furthered by the indicia of configured SR resources being received in radio resource control (RRC) signaling or downlink control information (DCI) from the gNB.

In a Fourth Example embodiment, the First Example is furthered by the downlink signals comprising one of a synchronization signal block, a control resource set (CORESET), or a maximum downlink symbol duration region the CORESET may occupy in time.

In a Fifth Example embodiment, the Third Example is furthered by the indicia of configured SR resources being provided by the gNB is received in a physical downlink control channel (PDDCH).

A Sixth Example embodiment further defines the First Example by the indicia of configured scheduling request (SR) resources having potentially both slot-level and symbol-level periodicities and is provided in a bitmap identifying which symbols in a specific numerology of resources to utilize for SR transmissions.

In a Seventh Example embodiment, the First Example is furthered by the indicia of configured scheduling request (SR) resources specifying SR transmission within physical uplink control channel (PUCCH) resources comprising a bitmap over slot symbols wherein each bit in the bitmap indicate starting symbol position of the PUCCH occasion within a slot.

In an Eighth Example embodiment, the First Example is furthered by the indicia of configured SR resources comprising at least two available profiles of SR resources, a first profile having symbol-level periodicities used for Ultra Reliable Low Latency Communications (URLLC) communications, and a second profile having slot-level periodicities used for Enhanced Mobile Broadband (eMBB) communications.

In a Ninth Example, the First Example is narrowed by the indicia of configured SR resources being dynamically adapted for activation and deactivation using L1 or L2 signaling.

In a Tenth Example embodiment, a mobile device to communicate in a wireless network that uses protocols with selectable size subcarrier spacing and time division duplexing (TDD) frames having a plurality of slots each comprising a plurality of symbols is disclosed including a memory; and a baseband processor comprising one or more processors, and configured to arrange uplink (UL) scheduling request (SR) transmissions having symbol-level periodicities based on indicia of SR resource opportunities stored in the memory, wherein the processing unit is further configured to determine whether a symbol in an SR transmission resource opportunity may overlap with one or more downlink signals being received at the same symbol, and if overlapping, not arrange SR transmission, at least during that same symbol.

In an Eleventh Example embodiment, the Tenth Example is furthered by any overlapping SR transmission not arranged for transmission at the overlapping symbol, is deferred to a next available SR resource opportunity.

In a Twelfth Example embodiment, the Tenth Example is furthered by the indicia of SR resource opportunities is received in radio resource control (RRC) signaling or downlink control information (DCI) from a next generation Node B (gNB).

In a Thirteenth Example embodiment, the Tenth Example is furthered by the one or more downlink signals comprising a synchronization signal block, a control resource set (CORESET), or a maximum downlink symbol duration region the CORESET may occupy in time.

In a Fourteenth Example embodiment, the Tenth Example is furthered by the indicia of SR resource opportunities comprising a bitmap or index of SR opportunities received in a physical downlink control channel (PDDCH).

In a Fifteenth Example embodiment, the Tenth Example is furthered by the indicia of SR resource opportunities specifying SR transmission within physical uplink control channel (PUCCH) resources indicating a starting symbol position of the PUCCH occasion within a slot.

In a Sixteenth Example embodiment, the Tenth Example is furthered by the indicia of SR resource opportunities comprising indicia of at least two available profiles of SR resources, a first profile having symbol-level periodicities used for Ultra Reliable Low Latency Communications (URLLC) communications, and a second profile having slot-level periodicities used for Enhanced Mobile Broadband (eMBB) communications.

In a Seventeenth Example embodiment, the Tenth Example is furthered by the indicia of SR resource opportunities being dynamically adapted for activation and deactivation using L1 or L2 signaling.

According to an Eighteenth Example embodiment, a computer-readable medium is disclosed for storing executable instructions that, in response to execution, cause one or more processors of a baseband processing circuit of a user equipment (UE), to perform operations comprising: storing indicia of SR resource opportunities received from a network station; arranging uplink (UL) scheduling request (SR) transmissions having symbol-level periodicities based on the stored indicia of SR resource opportunities; determining whether a symbol in an SR transmission resource opportunity overlaps with one or more downlink signals being received at the same symbol; and ceasing SR transmission at the same symbol when overlapping is determined.

In a Nineteenth Example embodiment, the Eighteenth Example is furthered by further including instructions to perform operations comprising: deferring an SR transmission from an overlapping symbol to a next available SR resource opportunity.

According to a Twentieth Example, the Eighteenth Example may be furthered by the indicia of SR resource opportunities comprises a bitmap specifying a starting point of SR transmission within a physical uplink control channel and symbols within a slot at which SR transmissions are repeated.

In a Twenty-First Example, the Eighteenth Example may by furthered, by the downlink signals comprising one of a synchronization signal block, a control resource set (CORESET), or a maximum downlink symbol duration region the CORESET may occupy in time.

In a Twenty-Second Example, any of the prior Examples may be performed as a method.

As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component.

One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The present disclosure has been described with reference to the attached drawing figures, with certain example terms and wherein like reference numerals are used to refer to like elements throughout. The illustrated structures, devices and methods are not intended to be drawn to scale, or as any specific circuit or any in any way other than as functional block diagrams to illustrate certain features, advantages and enabling disclosure of the inventive embodiments and their illustration and description is not intended to be limiting in any manner in respect to the appended claims that follow, with the exception of 35 USC 112, sixth paragraph, claims using the literal words "means for," if present in a claim. As utilized herein, the terms "component," "system," "interface," "logic," "circuit," "device," and the like are intended only to refer to a basic functional entity such as hardware, processor designs, software (e.g., in execution), logic (circuits or programmable), firmware alone or in combination to suit the claimed functionalities. For example, a component, module, circuit, device or processing unit "configured to," "adapted to" or "arranged to" may mean a microprocessor, a controller, a programmable logic array and/or a circuit coupled thereto or other logic processing device, and a method or process may mean instructions running on a processor, firmware programmed in a controller, an object, an executable, a program, a storage device including instructions to be executed, a computer, a tablet PC and/or a mobile phone with a processing device. By way of illustration, a process, logic, method or module can be any analog circuit, digital processing circuit or combination thereof. One or more circuits or modules can reside within a process, and a module can be localized as a physical circuit, a programmable array, a processor. Furthermore, elements, circuits, components, modules and processes/methods may be hardware or software, combined with a processor, executable from various computer readable storage media having executable instructions and/or data stored thereon. Those of ordinary skill in the art will recognize various ways to implement the logical descriptions of the appended claims and their interpretation should not be limited to any example or enabling description, depiction or layout described above, in the abstract or in the drawing figures.

What is claimed:

1. A baseband processor, comprising:
a memory interface; and
processing circuitry communicatively coupled to the memory interface and configured to perform operations comprising:
receiving a physical downlink control channel (PDCCH) signaling comprising slot format information (SFI) including information related to symbols of time division duplex (TDD) frames, the information corresponding to configured scheduling request (SR) resources having one or more of slot-level or symbol-level periodicities wherein a periodicity of the one or more SR resources is configured with 3 or 4 symbol periodicities associated with a 12 symbol enhanced cyclic prefix (ECP);
receiving L1 or L2 signaling comprising multiple SR resource configurations associated with the SR resources and an indication associated with the multiple SR resource configurations;
determining one or more SR resource configurations of the multiple SR resource configurations based on the indication; and
configuring activation and deactivation of SR transmissions at periods according to the determined one or more SR resource configurations, wherein activation and deactivation of SR transmissions includes activating the one or more SR resources with 3 or 4 symbol periodicities, and deactivating SR transmission occasions of periodicities other than 3 or 4 symbol periodicities.

2. The baseband processor of claim 1, wherein the indication is associated with a SR resource index or a bitmap of SR resource configurations.

3. The baseband processor of claim 2, wherein the indication further comprises a time-offset and a periodicity of the SR transmissions corresponding to a configured PUCCH type; and
 receiving the indication by radio resource control (RRC) signaling.

4. The baseband processor of claim 1, wherein the multiple SR resource configurations include a first SR resource profile having a symbol-level periodicity and a second SR resource profile having a slot-level periodicity.

5. The baseband processor of claim 4, wherein the first SR resource profile is associated with Ultra Reliable Low Latency Communications (URLLC) and the second SR resource profile is associated with Enhanced Mobile Broadband (eMBB); and
 receiving the indication by radio resource control (RRC) signaling, wherein the indication indicates dynamically configuring activation and deactivation of the first SR resource profile and the second SR resource profile.

6. The baseband processor of claim 1, wherein the indication is based on one or more of minimum system information (MSI), remaining minimum system information (RMSI), or other system information (OSI).

7. The baseband processor of claim 1, wherein the indication further indicates SR transmissions within physical uplink control channel (PUCCH) resources comprising a bitmap over slot symbols, wherein each bit in the bitmap indicates a starting symbol position of the PUCCH resources within a slot.

8. A user equipment (UE) comprising:
communication circuitry; and
one or more processors communicatively coupled to the communication circuitry and configured to:
 receive group common physical downlink control channel (PDCCH) signaling comprising slot format information (SFI) including information relating to symbols of time division duplex (TDD) frames, the information corresponding to configured scheduling request (SR) resources having one or more of slot-level or symbol-level periodicities and a selectable size subcarrier spacing;
 receive L1 or L2 signaling comprising resource configurations of the SR resources and an indication associated with the resource configurations;
 determine one or more SR resources of the SR resources based on the indication; and
 configure activation and deactivation of SR transmissions at periods according to the determined one or more SR resources, wherein a physical uplink control channel (PUCCH) comprises a SR transmission, and the activation and deactivation of SR transmissions includes deactivation of the PUCCH when a duration of the PUCCH exceeds a periodicity of the one or more SR resources.

9. The UE of claim 8, wherein the indication further indicates SR transmissions within physical uplink control channel (PUCCH) resources comprising a bitmap over slot symbols, wherein each bit in the bitmap indicates a starting symbol position of the PUCCH resources within a slot.

10. The UE of claim 8, wherein the selectable size subcarrier spacing is 15 kHz and a periodicity of the one or more SR resources is 2 symbols;
 the one or more processors further configured to determine that the periodicity of the one or more SR resources corresponds to a smaller number of SR occasions than the configured SR resources; and
 configure, based on determining that the periodicity of the one or more SR resources corresponds to the smaller number of SR occasions, a bitmap of size 7 to dynamically configure activation and deactivation of SR transmissions wherein the bitmap further corresponds to a physical uplink control channel (PUCCH) format for the SR transmissions.

11. The UE of claim 10, wherein the indication is based on one or more of minimum system information (MSI), remaining minimum system information (RMSI), or other system information (OSI).

12. The UE of claim 8, wherein a periodicity of the one or more SR resources is configured with 3 or 4 symbol periodicities associated with a 12 symbol enhanced cyclic prefix (ECP), and the activation and deactivation of SR transmissions includes activating the one or more SR resources with 3 or 4 symbol periodicities, and deactivating SR transmission occasions of periodicities other than 3 or 4 symbol periodicities.

13. The UE of claim 8, wherein the selectable size subcarrier spacing is 120 KHz and a periodicity of the one or more SR resources is 0.125 ms, 0.25 ms, or 0.5 ms.

14. The UE of claim 8, wherein the selectable size subcarrier spacing is 60 KHz and a periodicity of the one or more SR resources is 0.25 ms, or 0.5 ms.

15. A method for a User Equipment (UE), wherein the method causes the UE to:
 receive physical downlink control channel (PDCCH) signaling including information related to symbols of time division duplex (TDD) frames, the information corresponding to configured scheduling request (SR) resources;
 receive L1 or L2 signaling comprising multiple SR resource configurations associated with the SR resources and an indication associated with the multiple SR resource configurations, wherein the indication corresponds to a time offset and a periodicity of the multiple SR resource configurations;
 determine one or more SR resources of the multiple SR resources based on the indication;
 determine that the periodicity of the one or more SR resources corresponds to a smaller number of SR occasions than a number of configured SR resources; and
 configure, a bitmap of size 7 to dynamically configure activation and deactivation of SR transmissions at periods according to the determined one or more SR resources, wherein the bitmap further corresponds to a physical uplink control channel (PUCCH) format for the SR transmissions.

16. The method claim 15, wherein the multiple SR resource configurations include a first SR resource profile having a symbol-level periodicity and a second SR resource profile having a slot-level periodicity.

17. The method claim 16, wherein the first SR resource profile is associated with Ultra Reliable Low Latency Communications (URLLC) and the second SR resource profile is associated with Enhanced Mobile Broadband (eMBB); and
 receiving the indication by radio resource control (RRC) signaling, wherein the indication indicates dynamically configuring activation and deactivation of the first SR resource profile and the second SR resource profile.

18. The method claim 15, wherein the activation and deactivation is dynamically configured through layer 1 (L1) or layer 2 (L2) signaling.

19. The method of claim 15, wherein a periodicity of the one or more SR resources is configured with 3 or 4 symbol periodicities associated with a 12 symbol enhanced cyclic prefix (ECP), and the activation and deactivation of SR transmissions includes activating the one or more SR resources with 3 or 4 symbol periodicities, and deactivating SR transmission occasions of periodicities other than 3 or 4 symbol periodicities.

20. The method of claim 15, further configured with a PUCCH comprising a SR transmission, wherein the method includes dropping the PUCCH comprising the SR transmission when a duration of the PUCCH exceeds a periodicity of the one or more SR resources.

* * * * *